United States Patent

Ohsawa et al.

[11] Patent Number: 5,885,733
[45] Date of Patent: Mar. 23, 1999

[54] NON-AQUEOUS SECONDARY LITHIUM BATTERY

[75] Inventors: Toshiyuki Ohsawa, Kawasaki; Toshiyuki Kabata, Machida; Yoshiko Kurosawa, Yokohama; Okitoshi Kimura, Yokohama; Toshishige Fujii, Yokohama; Nobuo Katagiri, Yokohama; Yoshitaka Hayashi, Tokyo, all of Japan

[73] Assignee: Ricoh Company, Ltd., Tokyo, Japan

[21] Appl. No.: 896,459

[22] Filed: Jul. 18, 1997

Related U.S. Application Data

[63] Continuation of Ser. No. 713,252, Sep. 12, 1996, abandoned, which is a continuation of Ser. No. 498,801, Jul. 6, 1995, abandoned.

[30] Foreign Application Priority Data

Jul. 7, 1994 [JP] Japan .................................. 6-179394

[51] Int. Cl.⁶ .................................................. H01M 10/40
[52] U.S. Cl. ............................................ 429/192; 429/198
[58] Field of Search ..................... 429/190, 192, 429/194, 198; 252/162

[56] References Cited

U.S. PATENT DOCUMENTS

| | | | |
|---|---|---|---|
| 4,888,257 | 12/1989 | Narang ..................................... | 429/192 |
| 5,223,353 | 6/1993 | Ohsawa et al. . | |
| 5,419,098 | 5/1995 | Chaloner-Gill ......................... | 429/192 |
| 5,419,984 | 5/1995 | Chaloner-Gill et al. ................ | 429/192 |
| 5,436,092 | 7/1995 | Ohtsuka et al. ........................ | 429/194 |
| 5,458,996 | 10/1995 | Itoh et al. ........................... | 429/198 X |
| 5,491,040 | 2/1996 | Chaloner-Gill ......................... | 429/192 |
| 5,548,055 | 8/1996 | Narang et al. ............................. | 528/25 |
| 5,633,098 | 5/1997 | Narang .................................... | 429/104 |

*Primary Examiner*—Stephen Kalafut
*Attorney, Agent, or Firm*—Oblon, Spivak, McClelland, Maier & Neustadt, P.C.

[57] ABSTRACT

A non-aqueous secondary lithium battery includes a positive electrode; a negative electrode which including at least one component selected from the group consisting of lithium, a lithium alloy, and a host compound which forms an intercalation compound or complex in combination with lithium; and an electrolytic solution or solid electrolyte containing a silicone compound.

19 Claims, No Drawings

NON-AQUEOUS SECONDARY LITHIUM BATTERY

This application is a continuation of application Ser. No. 08/713,252, filed on Sep. 12, 1996, now abandoned, which is a continuation of application Ser. No. 08/498,801 filed on Jul. 6, 1995, now abandoned.

BACKGROUND OF THE INVENTION

1. Field of the Invention

The present invention relates to a non-aqueous secondary lithium battery with a negative electrode comprising metal lithium, a lithium alloy, or a host compound which forms an intercalation compound or complex with lithium ions.

2. Discussion of Background

A secondary lithium battery is expected to be put to practical use, not only as a power source for portable electronic appliances, but also as a power source for electric automobiles and as a power source for power storage.

However, conventional secondary lithium batteries using metal lithium as a negative electrode thereof have problems in the cycle life and safety thereof when used in practice, so that a secondary lithium battery with satisfactory performance has not yet been developed. It is considered that this is partly because a negative electrode with satisfactory performance for the secondary lithium battery has not yet been developed.

One problem of the negative electrode of such conventional secondary lithium batteries, when used in practice, is that the metal lithium used in the negative electrode is so reactive that the surface of the negative electrode is apt to react with a solvent in contact therewith.

Lithium ion is reduced during the charging of the battery, so that metal lithium is formed. However, the metal lithium is apt to be formed in the form of dendrite, which has a problem of destroying an insulating separator disposed between a positive electrode and the negative electrode.

In order to solve this problem, additives for an electrolytic solutions have been studied as reported in "Denka" 57, 523 (1989) by M. Morita, S. Aoki and Y. Matsuda; and Progress in Batteries & Solar Cells, Vol. 8 (1989).

Furthermore, new negative electrodes using as a negative electrode material therefor an intercalation compound in which lithium ions are incorporated, a carbon material in which metal lithium is stabilized, or a ceramic material, are now being developed.

Examples of an intercalant for lithium ion are natural graphite, pyrolytic carbon prepared by thermal decomposition of coal, coke or organic materials; and carbon materials obtained by carbonizing natural polymers and synthetic polymers. Such carbon materials may be in various forms such as in the forms of porous powder, carbon fibers, and glassy carbon.

Varieties of active carbon materials for the negative electrode have been proposed.

For example, a conducting carbon material obtained by carbonizing furfuryl resin at 1100° C. is proposed in Japanese Laid-Open Patent Application 2-66856; a conducting carbon material which is obtained by thermal treatment of an aromatic polyimide in the atmosphere of an inert gas at 2000° C. or more is proposed in Japanese Laid-Open Patent Application 61-277165; and a graphite prepared from graphite-like spherical carbon particles is proposed in Japanese Laid-Open Patent Application 4-115457.

Japanese Laid-Open Patent Application 61-77275 discloses a secondary battery comprising an electrode which is made of an insulating or semiconductive carbon material with a polyacene structure, which is prepared by subjecting a phenolic polymer to heat treatment.

Secondary batteries by use of the above negative electrodes are of an ionic system type and are in fact improved with respect to the cycle life and battery performance. However, the current characteristics thereof are insufficient for use in practice.

SUMMARY OF THE INVENTION

It is therefore an object of the present invention to provide a non-aqueous secondary lithium battery which has excellent current characteristics and extended cycle life and is capable of charging and discharging with high current density.

This object of the present invention can be achieved by a non-aqueous secondary lithium battery comprising (1) a positive electrode; (2) a negative electrode which comprises at least one component selected from the group consisting of lithium, a lithium alloy, and a host compound which forms an intercalation compound or complex with lithium; and (3) an electrolytic solution or solid electrolyte comprising a silicone compound.

In particular, as the above silicone compound preferable is a silicone compound having such a structure as comprising a Si—O skeleton with an oxyalkylene chain group being bonded to a side chain of the Si—O skeleton.

More specifically, an example of such a silicone compound is a compound having formula (1):

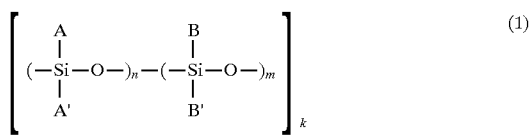

wherein n is an integer of 0 to 10; m and k are each an integer of 1 to 10; A and A' are each an alkyl group having 1 to 30 carbon atoms, preferably 1 to 12 carbon atoms, more preferably 1 to 6 carbon atoms; B and B' are each an active-hydrogen-free oxyalkylene chain group having 1 to 12 carbon atoms, preferably 1 to 6 carbon atoms, or an active-hydrogen-free alkyl group having 1 to 12 carbon atoms, preferably 1 to 6 carbon atoms, provided that at least one of B or B' is the active-hydrogen-free oxyalkylene group.

In the above silicone compound, it is more preferable that the active-hydrogen-free oxyalkylene chain group represented by B or B' in formula (1) be an oxyalkylene chain group having formula (2):

wherein q is an integer of 1 to 5; p is an integer of 1 to 10; R is an alkyl group having 1 to 12; and X is an alkylene group or oxyalkylene group having 1 to 6 carbon atoms.

The host compound for the non-aqueous secondary lithium battery of the present invention may comprise a carbon material as the main component.

The positive electrode of the non-aqueous secondary lithium battery of the present invention may comprise as the main component a conducting polymer and/or a transition metal compound.

DESCRIPTION OF THE PREFERRED EMBODIMENTS

In the non-aqueous secondary lithium battery of the present invention, when the above-mentioned silicone compound with formula (1) is used in the electrolytic solution or solid electrolyte thereof, the current characteristics of the battery can be significantly improved and therefore the silicone compound of formula (1) is particularly effective for increasing the energy density of the battery.

A specific example of the silicone compound with formula (1) is as follows:

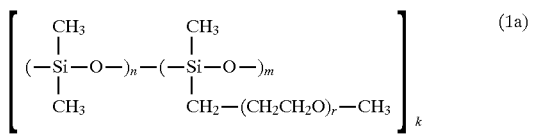

wherein n is an integer of 0 to 10, and m, r and k are each an integer of 1 to 10.

Generally, a silicone skeleton has a foam stabilizing function, so that silicone compounds are used as foam stabilizers.

In the silicone compound employed in the present invention, an alkoxyl group is added to a silicone compound, whereby the compatibility with a non-aqueous electric solution is improved. As a result, the surface energy of the interfaces of the electrodes in the non-aqueous battery is considered to be lowered in the present invention.

The above specific silicone compound of formula (1a) can be obtained by the steps of (i) adding $CH_2=CH-CH_2-OH$ to the following compound of formula (1b) by use of a platinum catalyst to obtain the following compound of formula (1c), and (ii) replacing the active hydrogen of the compound of formula (1c) with an oxyalkylene chain group as follows:

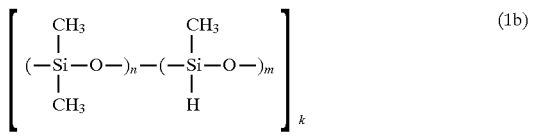

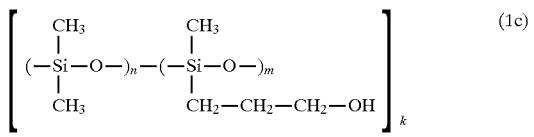

wherein n is an integer of 0 to 10, and m, r and k are each an integer of 1 to 10.

It is preferable that no active hydrogens be contained in the silicone compound of formula (1a). The presence of the active hydrogens can be identified by IR.

It is preferable that the amount of the silicone compound of formula (1), including the specific compound of formula (1a), be in an amount of 0.1 to 30 parts by weight, more preferably 1 to 10 parts by weight, to 100 parts by weight of a solid electrolyte or electrolytic solution.

The electrolytic solution for use in the non-aqueous secondary lithium battery of the present invention comprises an non-aqueous solvent and an electrolytic salt dissolved in the non-aqueous solvent.

Specific examples of the non-aqueous solvent for use in the present invention include carbonate solvents such as propylene carbonate, ethylene carbonate, butyrene carbonate, dimethyl carbonate and diethyl carbonate; amide solvents such as N-methylformamide, N-ethylformamide, N,N-dimethylformamide, N-methylacetamide, N-ethylacetamide and N-methylpyrrolidinone; lactone solvents such as γ-butyllactone, γ-valerolactone, δ-valerolactone, and 3-methyl-1,3-oxazolidin-2-one; alcohol solvents such as ethylene glycol, propylene glycol, glycerin, methyl cellosolve, 1,2-butanediol, 1,3-butanediol, 1,4-butanediol, diglycerin, polyoxyalkylene glycol, cyclohexanediol and xylene glycol; ether solvents such as methylal, 1,2-dimethoxyethane, 1,2-diethoxyethane, 1-ethoxy-2-methoxyethane, and alkoxy polyalkylene ether; nitrile solvents such as benzonitrile, acetonitrile and 3-methoxypropionitrile; phosphoric acids and phosphoric ester solvents such as orthophosphoric acid, methaphosphoric acid, pyrophosphoric acid, polyphosphoric acid, phosphorous acid and trimethyl phosphate; 2-imidazolidinone solvents such as 1,3-dimethyl-2-imidazolidinone; pyrrolidone solvents; sulfolane solvents such as sulfolane and tetramethylene sulfolane; furan solvents such as tetrahydrofuran, 2-methyltetrahydrofuran, and 2,5-dimethoxytetrahydrofuran; 1,3-dioxolane; dioxane; and dichloroethane. These solvents can be used alone or in combination.

Of the above solvents, carbonate solvents, ether solvents and furan solvents are particularly preferable for use in the present invention.

There is no particular restriction in the choice of the electrolytic salt in the present invention, and conventional electrolytic salts can be employed.

Specific examples of the electrolytic salt include $LiBR^4$ (wherein R is a phenyl group or an alkyl group), $LiPF_6$, $LiSbF_6$, $LiAsF_6$, $LiBF_4$, $LiClO_4$, $CF_3SO_3Li$, $(CF_3SO_2)_3NLi$, $(CF_3SO_2)_3CLi$, $C_6F_9SO_3Li$, $C_8F_{17}SO_3Li$, and $LiAlCl_4$.

Examples of preferable electrolytic salts for use in the present invention are sulfonic-acid-based anionic electrolytes such as $CF_3SO_3Li$, $(CF_3SO_2)_3NLi$, $(CF_3SO_2)_3CLi$, $C_6F_9SO_3Li$ and $C_8F_{17}SO_3Li$.

The concentration of the electrolytic salt in the non-aqueous electrolytic solution is normally in a range of 0.5 to 6 moles/l, and preferably in a range of 0.8 to 3.5 moles/l.

Specific examples of a polymeric solid electrolyte for use in the present invention are (1) composite materials prepared by dissolving any of the previously mentioned electrolytic salts in a polymer matrix such as poly(ethylene oxide), poly(propylene oxide), poly(vinylidene fluoride) or polyacrylamide; (2) gel composite materials prepared by the addition of solvents to the aforementioned composite materials; (3) polymeric solid electrolytes comprising low-molecular weight polyethylene oxide chains or ionic dissociation groups of crown either or the like in the polymer skeletons thereof; and (4) gel polymeric solid electrolytes prepared by containing any of the previously mentioned electrolytic solutions in the aforementioned polymeric solid electrolytes (3).

As the materials for the negative electrode for use in the present invention, there can be employed lithium, lithium alloys composed of lithium and aluminum, silicon, copper, zinc, or tin, a carbon material serving as a host compound which is capable of reversibly occluding and liberating lithium ions, and ceramic materials.

Examples of the above-mentioned carbon material are conducting, insulating or semiconductive carbon materials which are obtained by carbonizing natural polymers or synthetic resins such as phenolic reins, PAN-based resin, furan resin, polyamide resin, and polyimide resin.

As the carbon material for use in the present invention, it is preferable to use a graphite material as a major constituent.

Specific examples of the graphite material are natural graphite; and synthetic graphite prepared from pitch coke, needle coke, fluid coke, and gilsonite coke.

Examples of an active material for the positive electrode of the non-aqueous secondary lithium battery of the present invention are (A) metallic oxides such as $MnO_2$, $Mn_2O_3$, $CoO_2$, $NiO_2$, $TiO_2$, $V_2O_5$, $V_3O_8$, $Cr_2O_3$, $Fe_2(SO_4)_3$, $Fe_2$ ($MoO_2$)$_3$ and $Fe_2(WO_2)_3$, metallic sulfides such as $TiS_2$, $MoS_2$ and FeS, and composite oxides composed of any of the above compounds and lithium; (B) conducting polymers such as polyacetylene, polyaniline, polypyrrole, polythiophene, polyalkyl thiophene, polycarbazole, polyazulene and polydiphenyl benzidine; (C) carbon materials; and composite materials composed of any two of the aforementioned materials (A) to (C).

As the electrolyte for use in the present invention, the previously mentioned electrolytic solutions and solid electrolytes can be employed.

When necessary, a separator which exhibits low resistance to the movement of ions and has excellent liquid-holding properties can be employed. Examples of such a separator are woven or non-woven fabrics made of at least one material selected from the group consisting of glass, polyester, teflon, and polypropylene.

There are no particular limitations to the shape of the battery. Various types of batteries can be fabricated in practice, such as the coin type, sheet type and tube type.

Other features of this invention will become apparent in the course of the following description of exemplary embodiments, which are given for illustration of the invention and are not intended to be limiting thereof.

EXAMPLE 1

[Fabrication of Positive Electrode]

30 parts by weight of polyaniline were dissolved in 170 parts by weight of N-methyl-2-pyrrolidone. In this solution, 70 parts by weight of vanadium pentoxide were dispersed in a sand mill, whereby a coating liquid for the formation of a positive electrode was prepared.

The thus prepared coating liquid was coated on both sides of a 25 $\mu$m thick etched aluminum foil by blade coating and dried, whereby a positive electrode with a thickness of 60 $\mu$m was formed on each side of the etched aluminum foil.

[Fabrication of Negative Electrode]

80 parts by weight of natural graphite with a purity of 99.9% and 10 parts of weight of lithium tetrafluoroborate were dispersed in 100 parts by weight of a 10 wt. % N-methyl-2-pyrrolidone solution of a commercially available polyvinylpyridine resin (made by Koei Chemical Co., Ltd.), whereby a coating liquid for the formation of a negative electrode was prepared.

The thus prepared coating liquid was coated on both sides of a 20 $\mu$m thick SUS foil and dried at 100° C., whereby a negative electrode active material layer with a thickness of 80 $\mu$m was formed on each side of the SUS foil.

The above fabricated positive electrode and negative electrode were overlaid with a separator (Trademark "Celgard 3501" made by Daicel Chemical Industries, Ltd.) being interposed therebetween, and with the following electrolytic solution being placed between the positive electrode and the separator, and between the negative electrode and the separator, and those overlaid electrodes were then rolled, whereby a non-aqueous secondary lithium battery No. 1 with an AA size of the present invention was fabricated.

The electrolytic solution employed in this battery was prepared by mixing one part by weight of ethylene carbonate and one part by weight of dimethoxyethane with the addition of 2 moles of $(CF_3SO_2)_2NiLi$ thereto per one liter of the electrolytic solution.

In this example, 3 parts by weight of a silicone compound with the following formula were added to 100 parts by weight of the above prepared electrolytic solution:

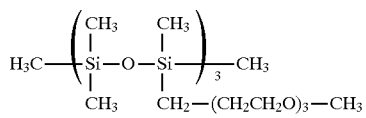

COMPARATIVE EXAMPLE 1

The procedure for fabricating the non-aqueous secondary lithium battery No. 1 of the present invention in Example 1 was repeated except that the silicone compound employed in Example 1 was eliminated from the electrolytic solution employed in Example 1, whereby a comparative non-aqueous secondary lithium battery No. 1 was fabricated.

EXAMPLE 2

The procedure for fabricating the non-aqueous secondary lithium battery No. 1 of the present invention in Example 1 was repeated except that the electrolytic solution employed in Example 1 was replaced by a polymeric solid electrolyte which was prepared as follows, whereby a non-aqueous secondary lithium battery No. 2 of the present invention was fabricated.

[Preparation of Polymeric Solid Electrolyte]

A photopolymerizable solution with the following formulation was prepared:

|  | Parts by Weight |
|---|---|
| lithium tetrafluoroborate | 20 |
| propylene carbonate | 51 |
| 1,2-dimethoxyethane | 16 |
| polyoxyethylene acrylate | 12.8 |
| trimethylolpropane acrylate | 0.2 |
| benzoin isopropyl ether | 0.02 |

With the addition of the same silicone compound as employed in Example 1 in an amount of 3 parts by weight to 100 parts by weight of the above prepared photopolymerizable solution for the preparation of the polymeric solid electrotyte, the mixture thereof was placed between the positive electrode and the separator, and between the negative electrode and the separator, and was then solidified with application of heat thereto, whereby a non-aqueous secondary lithium battery No. 2 of the present invention was fabricated.

COMPARATIVE EXAMPLE 2

The procedure for fabricating the non-aqueous secondary lithium battery No. 2 of the present invention in Example 2 was repeated except that the silicone compound employed in Example 2 was not added to the electrolytic solution employed in Example 2, whereby a comparative non-aqueous secondary lithium battery No. 2 was fabricated.

Each of the non-aqueous secondary lithium batteries Nos. 1 and 2 of the present invention and the comparative non-aqueous secondary lithium batteries Nos. 1 and 2 was subjected to tests for investigating the following characteristics of the battery:

(1) Energy, which indicates the discharge energy of the battery when a 10-minute charging-and-discharging cycle was repeated 10 times at ½ CmA;

(2) Cycle characteristics, which indicate the number of the charging and discharging cycles at ½ CmA repeated by the time when the discharge energy reached 70% of the above-mentioned energy (1);
(3) 2 CmA discharging, which indicates the percentage with respect to the energy (1) when 2 CmA discharging was conducted;
(4) 1 CmA 1 hour charging, which indicates the percentage with respect to the energy (1) when 1 CmA 1 hour charging was conducted.

The results were as follows:

|  | Ex. 1 | Ex. 2 | Comp. Ex. 1 | Comp. Ex. 2 |
|---|---|---|---|---|
| Energy | 485 mAh | 465 mAh | 388 mAh | 370 mAh |
| Cycle Characteristics | 500 | 500 | 350 | 400 |
| 2CmA Discharge | 88% | 81% | 66% | 58% |
| 1C 1 hr. Charge | 86% | 80% | 74% | 69% |

The above results indicate that the non-aqueous secondary lithium batteries of the present invention have excellent cycle life characteristics and are capable of being charged with high current density.

Japanese Patent Application No. 06-179394 filed on Jul. 7, 1994 is hereby incorporated by reference.

What is claimed is:

1. A non-aqueous secondary lithium battery comprising:
   a positive electrode;
   a negative electrode which comprises at least one component selected from the group consisting of lithium, a lithium alloy and a host compound which forms an intercalation compound or complex with lithium; and
   a liquid electrolyte, which comprises:
      a liquid electrolytic composition, which contains at least one solvent and at least one electrolytic salt; and
      at least one silicone compound.

2. The non-aqueous secondary lithium battery as claimed in claim 1, wherein said silicone compound comprises Si—O skeleton with an oxyalkylene chain group bonded to a side change of said Si—O skeleton.

3. The non-aqueous secondary lithium battery as claimed in claim 2, wherein said silicone compound is a compound having formula (1):

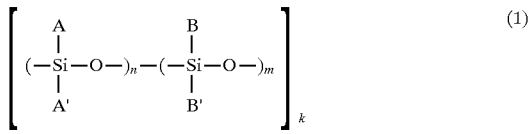

wherein n is an integer of 0 to 10; m and k are each an integer of 1 to 10; A and A' are each an alkyl group having 1 to 30 carbon atoms; B and B' are each an active-hydrogen-free oxyalkylene chain group having 1 to 12 carbon atoms, or an alkyl group having 1 to 12 carbon atoms, provided that at least one of B or B' is said active-hydrogen-free oxyalkylene group.

4. The non-aqueous secondary lithium battery as claimed in claim 3, wherein said active-hydrogen-free oxyalkylene chain group represented by B or B' in formula (1) is an oxyalkylene chain group having formula (2):

$$-(X)_q-(CH_2-CH_2-O)_p-R \quad (2)$$

wherein q is an integer of 1 to 5; p is an integer of 1 to 10; R is an alkyl group having 1 to 12 carbon atoms; and X is an alkylene group or an oxyalkylene group having 1 to 6 carbon atoms.

5. The non-aqueous secondary lithium battery as claimed in claim 1, wherein said host compound comprises a carbon material as the main component.

6. The non-aqueous secondary lithium battery as claimed in claim 1, wherein said positive electrode comprises as the main component a conducting polymer and/or a transition metal compound.

7. The non-aqueous secondary lithium battery as claimed in claim 1, wherein said liquid electrolyte comprises 100 parts by weight of said electrolytic composition; and 0.1 to 30 parts by weight of said at least one silicone compound, wherein said at least one silicone compound are the sole silicone compounds or compound in said liquid electrolyte.

8. The non-aqueous secondary lithium battery as claimed in claim 7, wherein said liquid electrolyte comprises 1 to 10 parts by weight of said at least one silicone compound.

9. The non-aqueous secondary lithium battery as claimed in claim 1, wherein said liquid electrolyte is prepared by a process comprising combining said at least one solvent, said at least one electrolytic salt and said at least one silicone compound.

10. A method of making the non-aqueous secondary lithium battery as claimed in claim 1, comprising contacting said positive electrode, said negative electrode and said liquid electrolyte.

11. A non-aqueous secondary lithium battery comprising:
    a positive electrode;
    a negative electrode which comprises at least one component selected from the group consisting of lithium, a lithium alloy, and a host compound which forms an intercalation compound or complex with lithium; and
    a solid electrolyte, which comprises:
       100 parts by weight of a solid electrolytic composition, which contains at least one solid polymer and at least one electrolytic salt; and
       0.1 to 30 parts by weight of at least one silicone compound represented by formula (1):

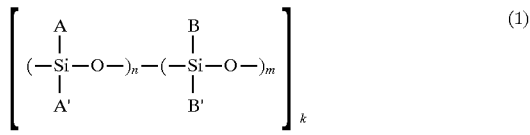

wherein
   n is an integer of 0 to 10;
   m and k are each an integer of 1 to 10;
   A and A' are each an alkyl group having 1 to 30 carbon atoms;
   B and B' are each an active-hydrogen-free oxyalkylene chain group having 1 to 12 carbon atoms, or an alkyl group having 1 to 12 carbon atoms, provided that at least one of B or B' is said active-hydrogen-free oxyalkylene group.

12. The non-aqueous secondary lithium battery as claimed in claim 11, wherein said solid electrolyte comprises 1 to 10 parts by weight of said at least one silicone compound.

13. The non-aqueous secondary lithium battery as claimed in claim 12, wherein said positive electrode comprises as the main component a conducting polymer and/or a transition metal compound.

14. The non-aqueous secondary lithium battery as claimed in claim 11, wherein said solid electrolytic composition further comprises at least one solvent.

15. The non-aqueous secondary lithium battery as claimed in claim 11, wherein said active-hydrogen-free oxyalkylene chain group represented by B or B' in formula (1) is an oxyalkylene chain group having formula (2):

 (2)

wherein q is an integer of 1 to 5; p is an integer of 1 to 10; R is an alkyl group having 1 to 12 carbon atoms; and X is an alkylene group or an oxyalkylene group having 1 to 6 carbon atoms.

16. The non-aqueous secondary lithium battery as claimed in claim 11, wherein said host compound comprises as the main component a conducting polymer and/or a transition metal compound.

17. The non-aqueous secondary lithium battery as claimed in claim 11, wherein said solid electrolyte is prepared by a process comprising combining said at least one solid polymer, said at least one electrolytic salt and said at least one silicone compound.

18. A method of making the non-aqueous secondary lithium battery as claimed in claim 11, comprising contacting said positive electrode, said negative electrode and said solid electrolyte.

19. The battery of claim 11, wherein said at least one silicone compound is the sole silicone compound in the solid electrolyte.

* * * * *

UNITED STATES PATENT AND TRADEMARK OFFICE
CERTIFICATE OF CORRECTION

PATENT NO. : 5,885,733
DATED : March 23, 1999
INVENTOR(S) : Toshiyuki OHSAWA et al It is certified that error appears in the above-identified patent and that said Letters Patent is hereby corrected as shown below:

Column 4, line 56, "as phenolic reins," should read --as phenolic resin,--.

Column 7, lines 40-41, "compound comprises SI-O" should read --compound comprises a SI-O--.

Column 7, line 42, "a side change of" should read --a side chain of--.

Signed and Sealed this

Twenty-first Day of November, 2000

Attest:

Q. TODD DICKINSON

Attesting Officer

Director of Patents and Trademarks